(12) United States Patent
Whittle et al.

(10) Patent No.: US 11,149,553 B2
(45) Date of Patent: Oct. 19, 2021

(54) CERAMIC MATRIX COMPOSITE COMPONENTS WITH HEAT TRANSFER AUGMENTATION FEATURES

(71) Applicant: Rolls-Royce plc, London (GB)

(72) Inventors: Michael J. Whittle, London (GB); Ian M. Edmonds, London (GB)

(73) Assignee: Rolls-Royce plc

( * ) Notice: Subject to any disclaimer, the term of this patent is extended or adjusted under 35 U.S.C. 154(b) by 192 days.

(21) Appl. No.: 16/530,604

(22) Filed: Aug. 2, 2019

(65) Prior Publication Data

US 2021/0032994 A1 Feb. 4, 2021

(51) Int. Cl.
| | |
|---|---|
| F01D 5/14 | (2006.01) |
| F01D 5/18 | (2006.01) |
| F01D 9/04 | (2006.01) |
| F01D 25/12 | (2006.01) |

(52) U.S. Cl.
CPC ............ *F01D 5/147* (2013.01); *F01D 5/186* (2013.01); *F01D 9/041* (2013.01); *F01D 25/12* (2013.01); *F05D 2230/21* (2013.01); *F05D 2240/12* (2013.01); *F05D 2240/30* (2013.01); *F05D 2260/202* (2013.01)

(58) Field of Classification Search
CPC .... F01D 5/188; F01D 5/189; F05D 2240/127; F05D 2260/22141; F05D 2260/2212; F05D 2260/221; F05D 2260/2214; F05D 2300/614; F05D 2300/702; B29B 11/00; B29B 11/04; B29B 11/16

See application file for complete search history.

(56) References Cited

U.S. PATENT DOCUMENTS

| | | | |
|---|---|---|---|
| 5,681,144 A | 10/1997 | Spring et al. | |
| 5,772,398 A * | 6/1998 | Noiret | F01D 5/189 |
| | | | 415/115 |
| 5,797,726 A | 8/1998 | Lee | |
| 6,116,854 A * | 9/2000 | Yuri | F01D 5/187 |
| | | | 416/97 R |
| 6,514,046 B1 | 2/2003 | Morrison et al. | |
| 6,709,230 B2 | 3/2004 | Morrison et al. | |
| 7,182,576 B2 | 2/2007 | Bunker et al. | |
| 7,326,030 B2 * | 2/2008 | Albrecht | F01D 5/147 |
| | | | 415/115 |
| 7,435,058 B2 | 10/2008 | Campbell et al. | |
| 9,527,262 B2 | 12/2016 | Zhang et al. | |
| 9,638,057 B2 | 5/2017 | Kwon | |
| 9,915,151 B2 | 3/2018 | Weaver et al. | |

(Continued)

FOREIGN PATENT DOCUMENTS

DE 19926817 A1 * 12/2000 ............. F01D 5/187

OTHER PUBLICATIONS

Translation of DE19926817A1 courtesy of Espace.net.*

*Primary Examiner* — Woody A Lee, Jr.
*Assistant Examiner* — Danielle M. Christensen
(74) *Attorney, Agent, or Firm* — Barnes & Thornburg LLP

(57) ABSTRACT

An airfoil assembly for use in a turbine of a gas turbine engine includes an airfoil that extends radially relative to an axis. The airfoil includes an inner surface that defines a cooling cavity that extends radially into the airfoil and an outer surface that defines a leading edge, a trailing edge, a pressure side, and a section side of the airfoil. The airfoil assembly further includes features for increasing the heat transfer coefficient of the airfoil.

20 Claims, 5 Drawing Sheets

(56) References Cited

U.S. PATENT DOCUMENTS

| | | |
|---|---|---|
| 9,945,234 B2* | 4/2018 | Jevons .................... F01D 5/282 |
| 9,988,913 B2 | 6/2018 | Spangler |
| 2003/0017053 A1* | 1/2003 | Baldwin ................. B29C 70/24 |
| | | 416/229 A |
| 2010/0247329 A1 | 9/2010 | Morgan |
| 2011/0110772 A1 | 5/2011 | Arrell et al. |
| 2016/0003053 A1 | 1/2016 | Propheter-Hinckley et al. |
| 2016/0214907 A1 | 7/2016 | Shim et al. |
| 2017/0067636 A1* | 3/2017 | Lacy .................... B22F 3/1055 |
| 2017/0211395 A1 | 7/2017 | Heffernan et al. |
| 2018/0105471 A1* | 4/2018 | Shi ........................ C23C 16/045 |
| 2018/0135457 A1* | 5/2018 | Propheter-Hinckley .................... |
| | | F01D 25/005 |
| 2020/0088050 A1* | 3/2020 | Whittle ................... F01D 9/044 |

\* cited by examiner

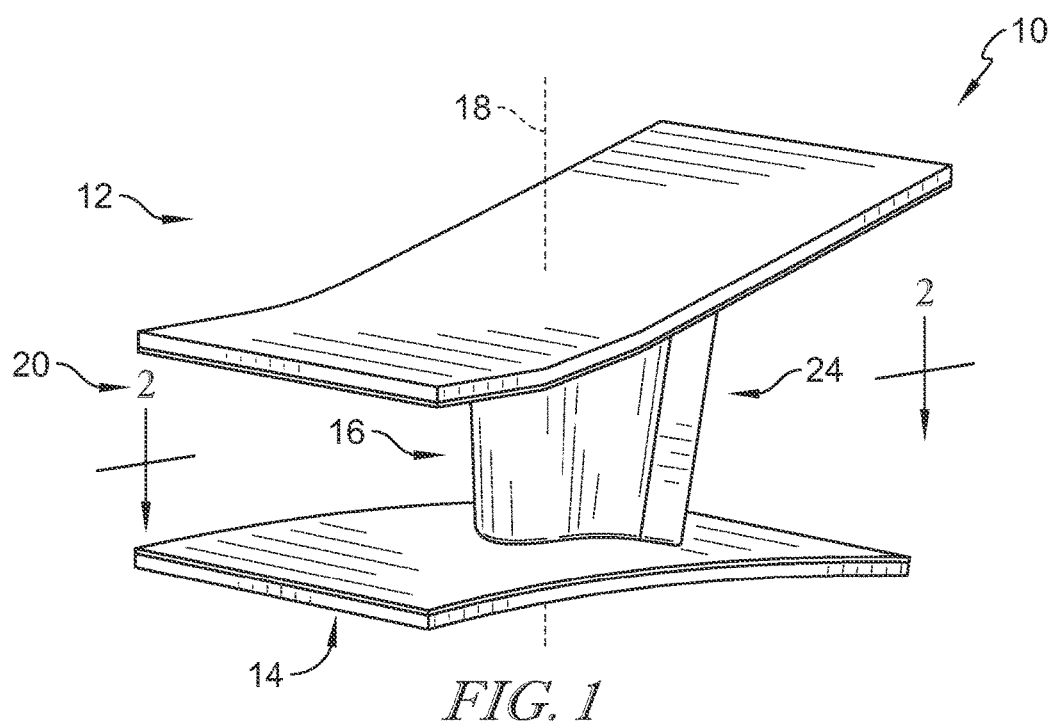
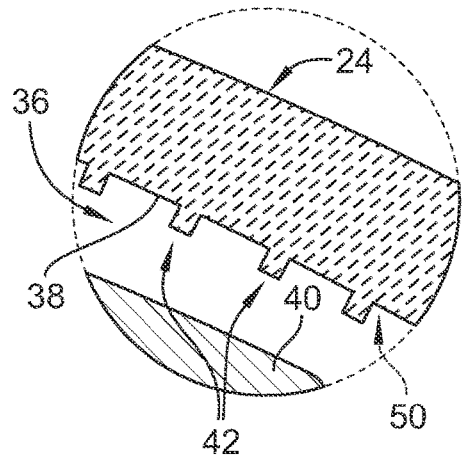
FIG. 3
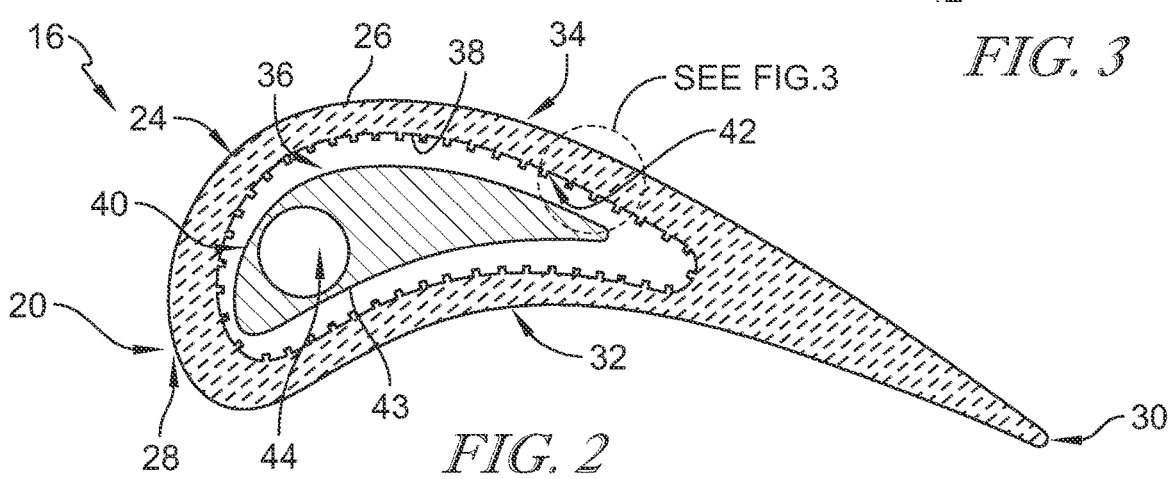
FIG. 2

CERAMIC MATRIX COMPOSITE COMPONENTS WITH HEAT TRANSFER AUGMENTATION FEATURES

FIELD OF THE DISCLOSURE

The present disclosure relates generally to airfoils used in gas turbine engines, and more specifically to vanes used in gas turbine engines that comprise composite materials.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Products of the combustion reaction directed into the turbine flow over airfoils included in stationary vanes and rotating blades of the turbine. The interaction of combustion products with the airfoils heats the airfoils and supporting structures to temperatures that require the airfoils and supporting structures to be made from high-temperature resistant materials and/or to be actively cooled by supplying relatively cool air to the vanes and blades. To this end, some composite materials adapted to withstand very high temperatures are being incorporated into vane and blade design. Design and manufacture of vanes and blades including composite components presents challenges.

SUMMARY

The present disclosure may comprise one or more of the following features and combinations thereof.

According to one aspect of the present disclosure, an airfoil assembly for use in a gas turbine engine includes a ceramic matrix composite airfoil, a guide structure, and a plurality of ceramic matrix composite pins. The ceramic matrix composite airfoil extends axially relative to an axis and includes an inner surface that defines an airfoil shaped cooling cavity that extends radially into the ceramic matrix composite airfoil and an outer surface that defines a leading edge, a trailing edge, a pressure side, and a section side of the ceramic matrix composite airfoil. The guide structure extends axially relative to the airfoil to define the cooling cavity between the inner surface of the airfoil and an outer surface of the guide structure. The plurality of ceramic matrix composite pins are embedded in the ceramic matrix composite airfoil.

In some embodiments, the plurality of ceramic matrix composite pins protrude away from the inner surface partway into the cooling cavity to increase a heat transfer coefficient of the ceramic matrix composite airfoil. In some embodiments, the plurality of ceramic matrix composite pins include through-thickness reinforcement pins.

In some embodiments, the ceramic matrix composite airfoil includes a body and a layer of environmental barrier coating coupled with the body. The body defines the inner surface and the environmental barrier coating defines the outer surface of the ceramic matrix composite airfoil. In some embodiments, each of the plurality of ceramic matrix composite pins extends into the body toward the environmental barrier coating without extending through the environmental barrier coating. In some embodiments, the each of the plurality of ceramic matrix composite pins extends into the body to the environmental barrier coating and contacts the environmental barrier coating. In some embodiments, the pins extend through the environmental barrier coating.

In some embodiments, the plurality of ceramic matrix composite pins include a first end embedded in the ceramic matrix composite airfoil and a second end spaced apart from the first end. The second end of each of the plurality of ceramic matrix composite pins is cantilevered in the cooling cavity and spaced apart from the guide structure. In some embodiments, each of the plurality of ceramic matrix composite pins have a non-circular cross section when viewed from the first end toward the second end.

In some embodiments, the plurality of ceramic matrix composite pins includes a first set of pins located at a first axial location along the airfoil relative to the axis and a second row of pins spaced apart from the first row pins and located at a second axial location relative to the axis to define a channel between the first row of pins and the second row of pins for directing a flow of cooling air in the cooling cavity aft toward the trailing edge while impeding the flow of cooling air from moving axially away from the channel.

In some embodiments, the plurality of ceramic matrix composite pins has a first density at the leading edge of the ceramic matrix composite airfoil and a second density at a point located between the leading edge and the trailing edge along a camber line of the airfoil and the second density is less than the first density. In some embodiments, each of the plurality of ceramic matrix composite pins is tufted with the inner surface of the ceramic matrix composite airfoil.

According to another aspect of the present disclosure, an airfoil assembly for use in a gas turbine engine includes an airfoil and a plurality of pins. The airfoil extends axially relative to an axis. The airfoil includes an inner surface that defines a cavity that extends axially into the airfoil and an outer surface that defines a leading edge, a trailing edge, a pressure side, and a section side of the airfoil. The plurality of pins are coupled with the airfoil and protrude away from the inner surface of the airfoil into the cavity. In some embodiments, each of the plurality of pins extends partway into the cavity. In some embodiments, the airfoil assembly further includes a support spar that extends axially into the cavity.

In some embodiments, each of the plurality of pins extends between a first end and a second end and have a non-circular cross section when viewed from the first end toward the second end. In some embodiments, the plurality of pins includes a first row of pins located at a first axial location along the airfoil relative to the axis and a second row of pins spaced apart from the first row pins and located at a second axial location relative to the axis to define a channel between the first row of pins and the second row of pins.

In some embodiments, the airfoil includes a body and a layer of environmental barrier coating coupled with the body. The body defines the inner surface and the environmental barrier coating defines the outer surface of the airfoil. Each of the plurality of pins extends into the body toward the environmental barrier coating.

According to another aspect of the present disclosure, a method includes: forming ceramic fiber into an airfoil shaped preform having a cooling cavity defined in the preform. The method further includes inserting reinforcements into the preform so that a portion of each reinforcements protrudes into the cooling cavity. The method further includes infiltrating the preform with ceramic matrix material to densify the preform and to embed the reinforcements in the preform to form a ceramic matrix composite airfoil having a plurality of protrusions that extend into the cooling cavity.

In some embodiments, the reinforcements comprise linear and rigid pins. In some embodiments, the inserting step includes pushing the pins into the preform to cause the ceramic fibers to be parted around the pins without the ceramic fibers fracturing. In some embodiments, the pins cause the preform to tuft such that depressions that face the cooling cavity are provided in the ceramic matrix composite airfoil after the infiltrating step. In some embodiments, the reinforcements comprise ceramic fibers the step of inserting includes stitching the ceramic fibers into the preform so that a portion of the ceramic fibers protrude into the cooling cavity.

These and other features of the present disclosure will become more apparent from the following description of the illustrative embodiments.

BRIEF DESCRIPTION OF THE DRAWINGS

FIG. 1 is perspective view of a nozzle guide vane assembly adapted for use in a gas turbine engine, the vane including an outer endwall, an inner endwall spaced apart from the outer endwall, and an airfoil extending between the outer endwall and the inner endwall and shaped to interact with gases traveling through a gas flow path defined between the outer endwall and the inner endwall;

FIG. 2 is a cross-section view taken along line 2-2 of the vane of FIG. 1 showing that the airfoil is made from ceramic matrix composite materials and is formed to include a cooling cavity defined by an inner surface of the airfoil and showing a plurality of pins protruding beyond the inner surface into the cooling cavity to increase a heat transfer coefficient of the airfoil;

FIG. 3 is an enlarged view of the airfoil and the pins shown in FIG. 2;

FIG. 7A shows a pin with a circular shaped cross section;

FIG. 7B shows a pin with an X-shaped cross section;

FIG. 7C shows a pin with a rectangular shaped cross section;

FIG. 7D shows a pin with a crescent shaped cross section;

FIG. 7E shows a pin with a triangular shaped cross section;

FIG. 7F shows a pin with a square shaped cross section;

FIG. 7G shows a pin with a S-shaped cross section;

FIG. 7H shows a pin with an elliptical shaped cross section;

DETAILED DESCRIPTION OF THE DRAWINGS

Figure 4:
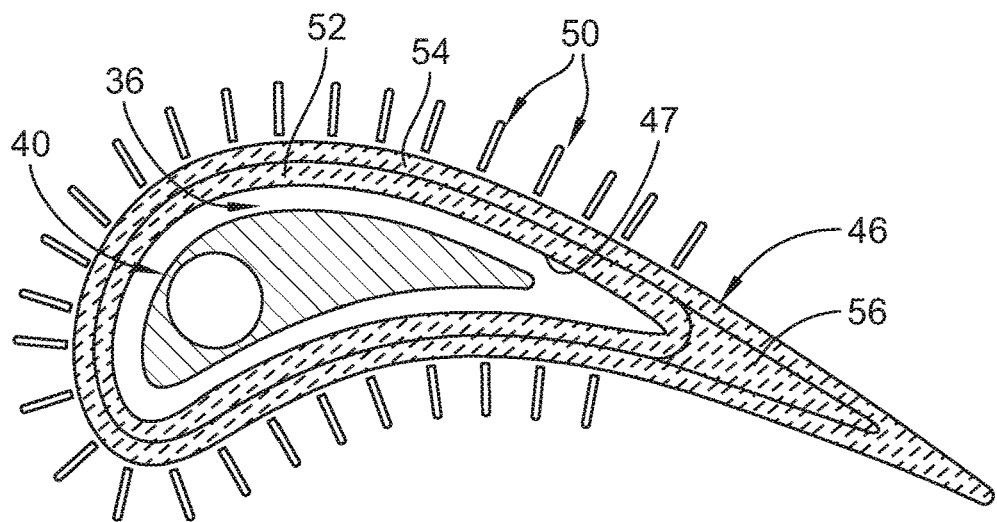
FIG. 4 is a cross-section view similar to FIG. 2 of the airfoil during a preforming stage with the plurality of pins removed and suggesting that the plurality of pins are configured to be inserted through the airfoil to provide through-thickness reinforcement.

For the purposes of promoting an understanding of the principles of the disclosure, reference will now be made to a number of illustrative embodiments illustrated in the drawings and specific language will be used to describe the same.

An illustrative nozzle guide vane 10 for use in a gas turbine engine is shown in FIG. 1. The nozzle guide vane 10 includes an outer endwall 12, an inner endwall 14 spaced apart from the outer endwall 12, and an airfoil assembly 16 arranged between the outer endwall 12 and the inner endwall 14 as shown in FIGS. 1 and 2. The outer endwall 12 and the inner endwall 14 are spaced apart axially from one another relative to an axis 18 and provide boundaries for a gas flow path 20 between one another. The airfoil assembly 16 extends generally along the axis 18 between the outer endwall 12 and the inner endwall 14 through the gas flow path 20.

The airfoil assembly 16 includes a ceramic matrix composite airfoil 24 as shown in FIGS. 2 and 3. The ceramic matrix composite airfoil 24 has an outer surface 26 shaped to interact with gases flowing through the gas flow path 20 and is configured direct the gases toward rotating blades (not shown) to increase efficiencies of the gas turbine engine. The airfoil 24 also has a leading edge 28, a trailing edge 30, a pressure side 32, and a suction side 34 and is formed to include an airfoil-shaped cooling cavity 36 defined by an inner surface 38 of the airfoil 24. The inner surface 38 of the airfoil 24 defines a boundary of the cooling cavity 36 and has a plurality of augmentation features 42 as shown in FIG. 3. The plurality of augmentation features 42 provide a plurality of protrusions and/or turbulators that extend into the cooling cavity to increase a heat transfer coefficient of the airfoil 24 to facilitate cooling of the airfoil 24 during use.

Figure 9:
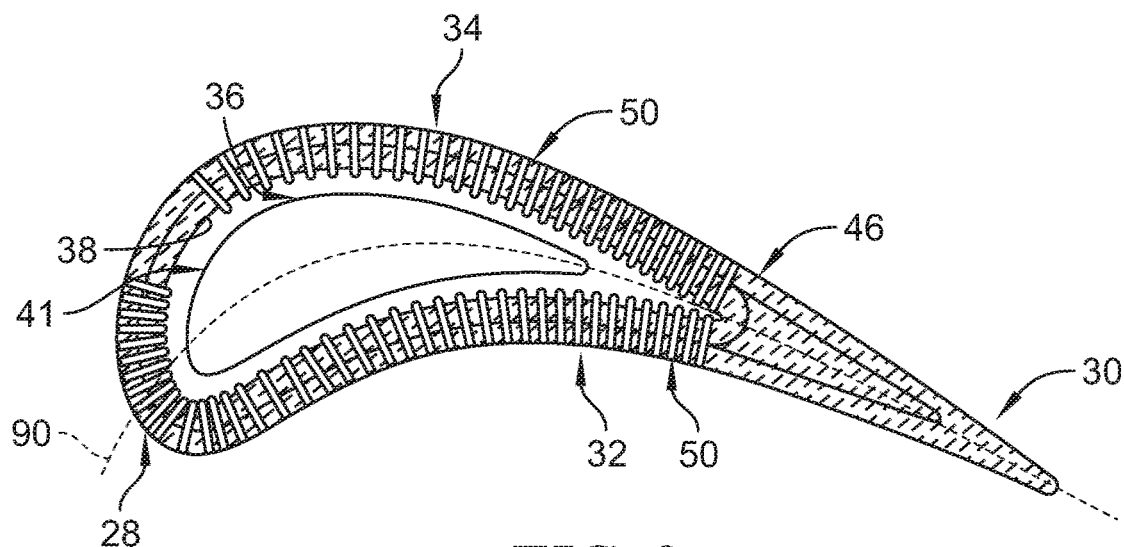
FIG. 9 is a cross section view of another arrangement of pins showing that the plurality of pins have a varying spacing density as the airfoil extends from a leading edge to a trailing edge along a camber line of the airfoil.

The airfoil assembly 16 further includes a guide structure 40 located in the cooling cavity 36 as shown in FIG. 2. The guide structure 40 defines the cooling cavity 36 radially between an outer surface 43 of the guide structure 40 and the inner surface 38 of the airfoil 24. The guide structure 40 is sizes to provide the cooling cavity as a channel 36 that extends circumferentially around the guide structure 40 to encourage interaction between the cooling fluid and the augmentation features 42. The cooling fluid travels aft toward the trailing edge 30 of the airfoil 24 along the inner surface 38 and cools the airfoil 24 before being discharged into the gas flow path 20. In one embodiment, the guide structure 40 is a metallic spar that extends axially through the airfoil 24 relative to the axis 18 to reinforce the airfoil assembly 16 and to bear force loads acting on the airfoil 24. In some embodiments, the spar 40 is formed to include a cooling-fluid passageway 44 that is configured to conduct cooling fluid into the cooling cavity 36. In other embodiments, the guide structure 40 is a CMC component 41, as shown in FIG. 9, and may be solid or hollow.

Figure 5:
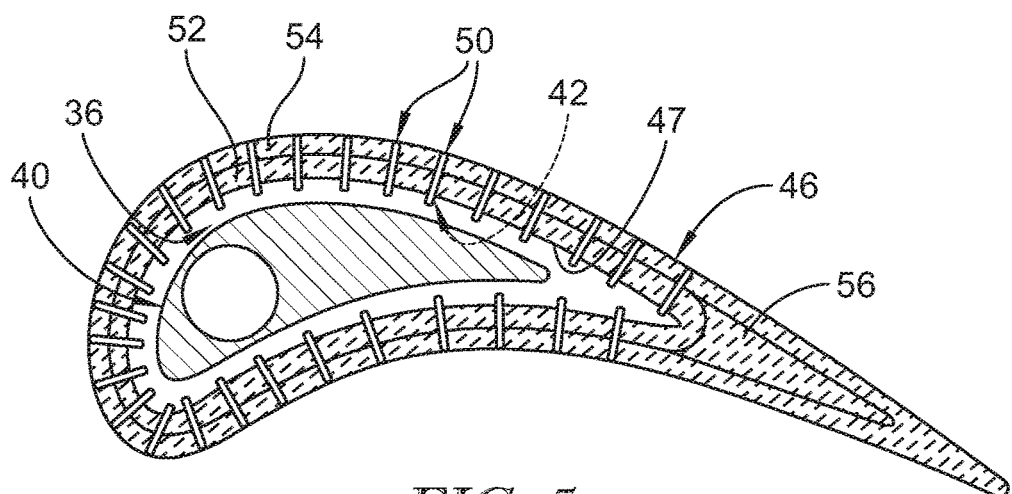
FIG. 5 is a cross section view similar to FIG. 4 of the airfoil after the plurality of pins are inserted showing that the pins provide through-thickness reinforcement for the airfoil and have ends that protrude into the cooling cavity to also increase the heat transfer coefficient of the airfoil.

In the illustrative embodiment, the airfoil 24 is constructed from a ceramic reinforcement fiber preform 46 as shown in FIGS. 4 and 5. The ceramic reinforcement fiber preform 46 includes a plurality of reinforcement fibers 48 that are two-dimensionally or three-dimensionally woven or braided together. Prior to being processed with ceramic matrix material, the ceramic reinforcement fiber preform 46 is relatively compliant so that it can be molded into an aerodynamic shape.

In the illustrative embodiment, the plurality of augmentation features 42 are formed by embedding a plurality of through-thickness reinforcement pins 50 into the ceramic reinforcement fiber preform 46 as shown in FIGS. 4 and 5. The plurality of pins 42 are embedded into the ceramic reinforcement fiber preform 46 through direct insertion, z-pinning, or another suitable insertion process during the preforming stage of the airfoil 24 to avoid fracturing the fibers in the preform 46. Fracturing or breaking fibers may compromise the airfoil's 24 structural integrity. As a result, the fibers of the preform 46 are parted around the rigid reinforcement pins 50. However, some damage to the fibers as a result of embedding the pins 50 into the preforming may still be acceptable.

Once the plurality of pins 42 are embedded, the ceramic reinforcement fiber preform 46 is infiltrated with ceramic matrix material to densify the reinforcement fiber preform 46 and form a one-piece CMC airfoil 24. Some suitable densification processes include chemical vapor infiltration, slurry infiltration, and/or melt infiltration. The ceramic reinforcement fiber preform 46 forming the airfoil 24 may include a silicon carbide fiber preform suspended in silicon carbide matrix material. In other embodiments, other suitable CMC materials may be used.

Other through-thickness reinforcement structures may be contained entirely within the structure they are reinforcing. In contrast, the plurality of pins 50 in the illustrative embodiment intentionally protrude past an inner surface 47 of the ceramic reinforcement fiber preform 46 and into the cooling cavity 36 to simultaneously reinforce the airfoil 24 in the radial direction and increase the heat transfer coefficient of the airfoil 24.

Illustratively, the plurality of reinforcement pins 50 are made from the same or a similar ceramic material used to infiltrate the ceramic reinforcement fiber preform 46 such as, for example, pultruded pins of silicon carbide fibers immobilized in a low char fugitive polymer and/or SCS-ultra fibers or SiC yarn. The plurality of reinforcement pins 50 are pre-densified before the ceramic reinforcement fiber preform 46 so that the pins 50 have sufficient rigidity to be embedded into the ceramic reinforcement fiber preform 46. As such, the illustrative embodiments, the pins 50 are not infiltrated by ceramic material during the infiltration of the fiber preform 46 because the pins 50 are pre-densified. Even still, during the infiltration with the ceramic matrix material, the plurality of reinforcement pins 50 and the ceramic reinforcement fiber preform 46 are integrated together such that the pins 50 are embedded in the airfoil wall. The plurality of reinforcement pins 50 form a part of the inner surface 38 of the airfoil 24 to provide the augmentation features 42 where they protrude into the cooling cavity 36.

In the illustrative embodiment, the ceramic reinforcement fiber preform 46 includes an inner preform tube 52, an outer preform tube 54, and a trailing edge filler 56 positioned between the inner preform tube 52 and the outer preform tube 54 as shown in FIGS. 4 and 5. The inner preform tube 52 defines the inner surface 47 of the ceramic reinforcement fiber preform 46 and cooperates with the plurality of reinforcement pins 50 to provide the inner surface 38 of the airfoil 24 after infiltration. The outer preform tube 54 encapsulates the inner preform tube 52 and the trailing edge filler 56 and defines the outer surface 26 of the airfoil 24 after infiltration. The plurality of reinforcement pins 50 extend radially through the outer preform tube 54 and the inner preform tube 52 to tie the inner and outer preform tubes 52, 54 together by through-thickness reinforcement. At the same time, the plurality of reinforcement pins 50 protrude beyond the inner surface 47 and into the cooling cavity to provide the augmentation features 42 after infiltration.

Figure 6:
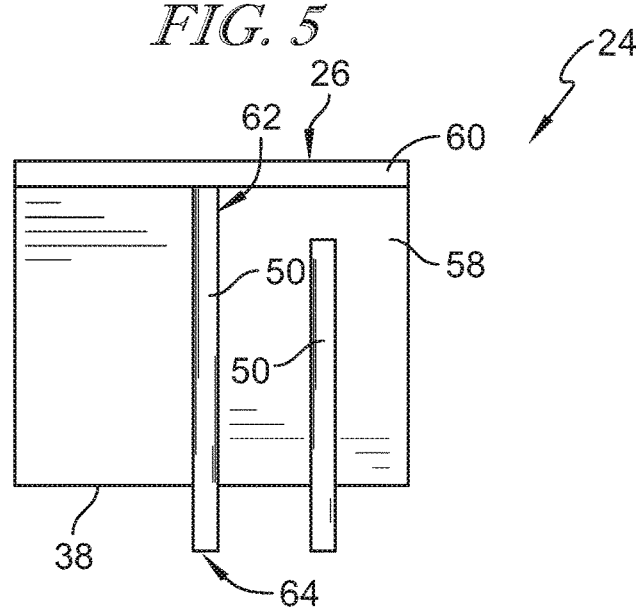
FIG. 6 is an enlarged plane view of the airfoil and one of the plurality of pins embedded in the airfoil with an end of the pin extending beyond the inner surface of the airfoil and an environmental barrier coating applied on an outer surface of the airfoil opposite the inner surface.

After infiltration, the airfoil 24 includes a single, integral, one-piece body 58 as shown in FIG. 6. A layer of environmental barrier coating 60 may be applied on the body 58 to block recession of the ceramic matrix composite materials. The body 58 of the airfoil 24 defines the inner surface 38 and the environmental barrier coating 60 defines the outer surface 26 of the ceramic matrix composite airfoil 24. Each of the plurality of reinforcement pins 50 extends into the body 58 toward the environmental barrier coating 60 without extending through the environmental barrier coating 60. In some embodiments, the plurality of ceramic matrix composite pins 50 contacts the environmental barrier coating 60. In other embodiments, the pins 50 stop in the ceramic airfoil wall before reaching the environmental barrier coating 60.

Each of the plurality of reinforcement pins 50 includes a first end 62 embedded in the ceramic matrix composite airfoil 24 and a second end 64 spaced apart from the first end 62 as shown in FIG. 6. The second end 64 of each of the plurality of reinforcement pins 50 is cantilevered in the cooling cavity 36 and spaced apart radially from the guide structure 40. The first end 62 may terminate in the airfoil wall such that is spaced apart from the environmental barrier coating.

Figure 6A:
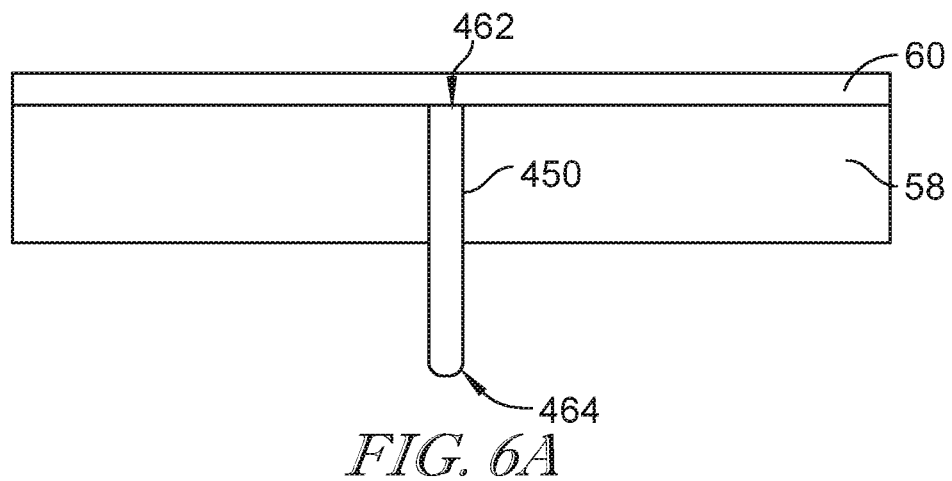
FIG. 6A is a plane view similar to FIG. 6 showing another embodiment of a pin with a rounded end.

Another embodiment of a reinforcement pin 450 is shown in FIG. 6A. The reinforcement pin 450 includes a first end 462 embedded in the ceramic matrix composite airfoil 24 and a second end 464 spaced apart from the first end 462. The second end 464 of the reinforcement pin 450 is cantilevered in the cooling cavity 36 and spaced apart radially from the guide structure 40. The second end 464 is rounded to increase aerodynamics of the pins 450 in the cooling cavity 36 and facilitate insertion into the preform 46.

Figure 6B:
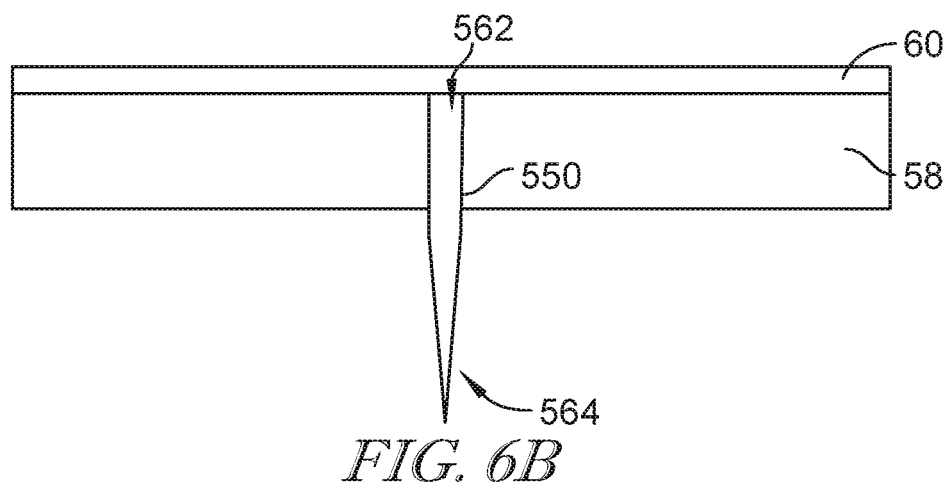
FIG. 6B is a plane view similar to FIG. 6 showing another embodiment of a pin with a tapered end.

Another embodiment of a reinforcement pin 550 is shown in FIG. 6B. The reinforcement pin 550 includes a first end 562 embedded in the ceramic matrix composite airfoil 24 and a second end 564 spaced apart from the first end 562. The second end 564 of the reinforcement pin 550 is cantilevered in the cooling cavity 36 and spaced apart radially from the guide structure 40. The second end 564 tapers as the pin 550 extends from the inner surface 38 of the airfoil 24 toward the second end 564 to increase aerodynamics of the pins 550 in the cooling cavity 36 and facilitate insertion into the preform 46.

Figure 6C:
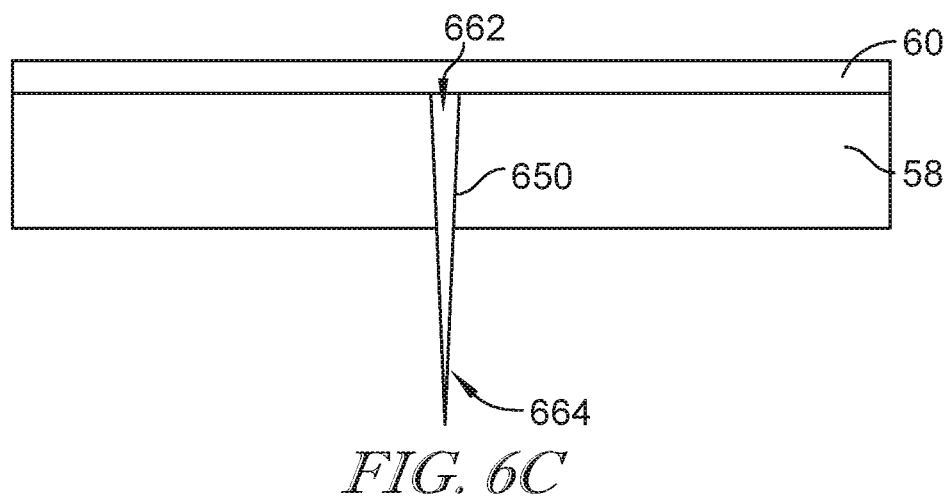
FIG. 6C is a plane view similar to FIG. 6 showing another embodiment of a pin that tapers across the length of the pin.

Another embodiment of a reinforcement pin 650 is shown in FIG. 6C. The reinforcement pin 650 includes a first end 662 embedded in the ceramic matrix composite airfoil 24 and a second end 664 spaced apart from the first end 662. The second end 664 of the reinforcement pin 650 is cantilevered in the cooling cavity 36 and spaced apart radially from the guide structure 40. The second end 664 tapers as the pin 650 extends from the first end 662 toward the second end 664 to increase aerodynamics of the pins 650 in the cooling cavity 36 and facilitate insertion into the preform 46.

Figure 7A:
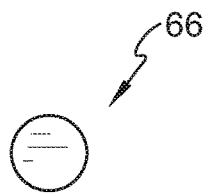
FIGS. 7A-7H show various cross sections that the plurality of pins may have to optimize heat transfer and/or flow characteristics of the cooling fluid.
Figure 7B:
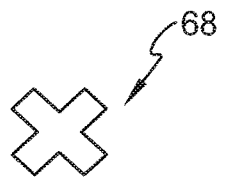
Figure 7C:
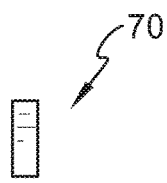
Figure 7D:
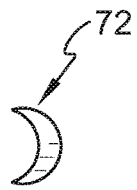
Figure 7E:
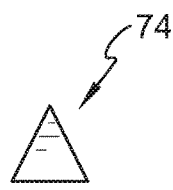
Figure 7F:
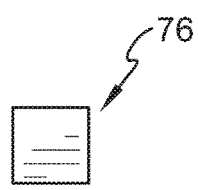
Figure 7G:
Figure 7H:
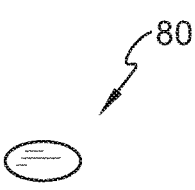

In the illustrative embodiment, the plurality of reinforcement pins 50 may be shaped to optimize heat transfer between the airfoil 24 and the cooling fluid flowing through the cooling cavity 36. Each of the reinforcement pins 50 may be formed by pultrusion or extrusion and may have a circular cross section 66 as shown in FIG. 7A. In other embodiments, the reinforcement pins 50 may be formed by pultrusion, extrusion, or another suitable pin making process. In some embodiments, each of the reinforcement pins 50 may have an X-shaped cross section 68 as shown in FIG. 7B. In some embodiments, the reinforcement pins 50 may have a rectangular cross section 70 as shown in FIG. 7C. In some embodiments, the reinforcement pins 50 may have a crescent cross section 72 as shown in FIG. 7D. In some embodiments, the reinforcement pins 50 may have a triangular cross section 74 as shown in FIG. 7E. In some embodiments, the reinforcement pins 50 may have a square cross section 76 as shown in FIG. 7F. In some embodiments, the reinforcement pins 50 may have an S-shaped cross section 78 as shown in FIG. 7G. In some embodiments, the reinforcement pins may have an elliptical cross section 80 as shown in FIG. 7H. The pins 50 could also be tapered or barbed. For example, the roughness of the SiC components of the pins maybe tailored to influence the frictional forces which may yield through-thickness property improvements.

Figure 8:
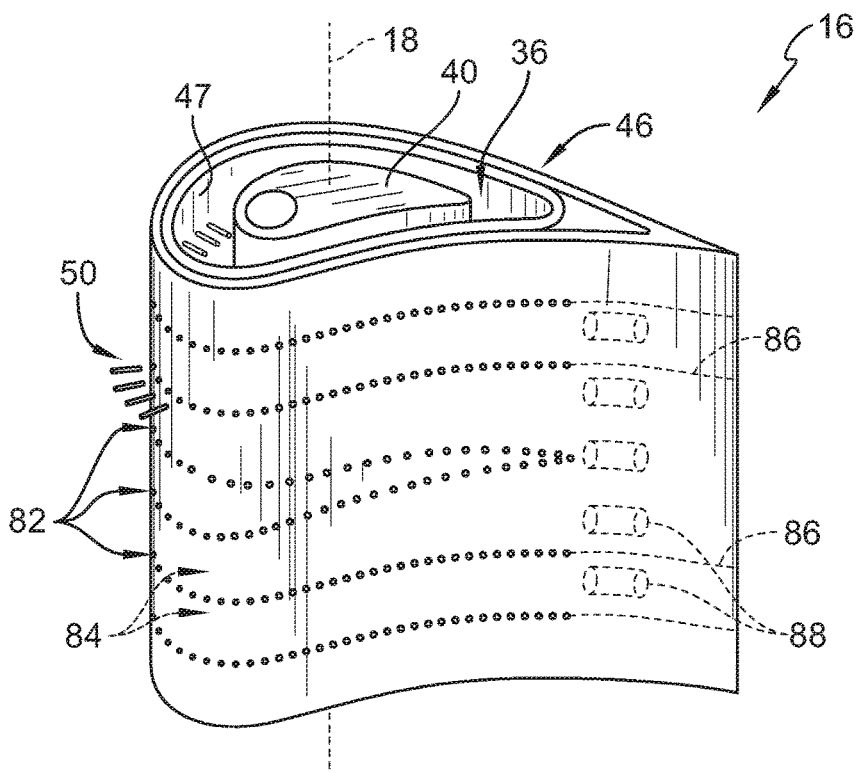
FIG. 8 is a perspective view of an illustrative airfoil with a plurality of pins embedded in the airfoil and arranged to form radially spaced apart sets of pins that define channels radially between one another.

In the illustrative embodiment, the plurality of reinforcement pins 50 may be inserted though the ceramic reinforcement fiber preform 46 in selective locations to optimize heat transfer between the airfoil 24 and the cooling fluid flowing through the cooling cavity 36 as shown in FIG. 8. For example, the plurality of reinforcement fibers 50 may be grouped in sets to guide the cooling fluid within the cooling cavity 36. The plurality of reinforcement fibers 50 may include a plurality of sets 82 spaced apart axially from on another relative to the axis 18 as shown in FIG. 8. The plurality of sets 82 define channels 84 directly between neighboring sets 82. The channels 84 are configured to guide the cooling fluid through the cooling cavity 36 until it is discharged from the cooling cavity 36.

Each set 82 of reinforcement pins 50 extends generally along a line 86 as shown in FIG. 8. The lines 86 are equally spaced and generally parallel to the one another and perpendicular to the axis 18. However, in other embodiments, the lines 86 may be unequally spaced and arranged at different orientations relative to one another. Each set 82 of reinforcement pins 50 may be oriented differently from one another and may be arranged at a non-orthogonal angle relative to the axis 18. In this way, the sets 82 of reinforcement pins 50 may define channels 84 that direct the cooling fluid to discrete locations such as, for example, one or more cooling holes 88 formed in the airfoil 24 and/or selective areas of the airfoil 24 where additional cooling may be desired. Once formed, the cooling holes 88 may extend from the cooling cavity 36 to the gas flow path 20 as suggested in FIG. 8. The pins 50 forming the channels may create air pressure barriers that resist movement of the cooling air in the cavity 36 from moving axially out of the respective channel the air is in.

The plurality of reinforcement pins 50 may have an arrangement that changes the heat transfer coefficient of the airfoil 24 in different areas of the airfoil 24 relative to a camber line 90 of the airfoil 24 as shown in FIG. 9. The camber line 90 extends from the leading edge 28 to the trailing edge 30 and is spaced equally between the pressure side 32 and the suction side 34. For example, the plurality of reinforcement pins 50 may be spaced apart with varying density in the airfoil 24 as the airfoil 24 extends aft along the camber line 90 from the leading edge 28 to the trailing edge 30. In other words, there may be more pins per linear inch in a first region than pins per linear inch in a second region.

The plurality of reinforcement pins 50 have a first non-zero spacing density located directly at the leading edge 28 of the airfoil 24 and a second non-zero spacing density, less than the first spacing density, at a location along the pressure side 32 and/or the suction side 34 directly downstream from the leading edge 28 relative to the camber line 90. The spacing density of the plurality of reinforcement pins 50 in the pressure and/or suction sides 32, 34 may increase as the airfoil 24 extends aft toward the trailing edge 30 relative to the camber line 90. The increase in spacing density may be a linear or an exponential increase in density. In other embodiments, the size and shape of the pins 50 may vary around the inner surface or along the axis 18.

Figure 10:
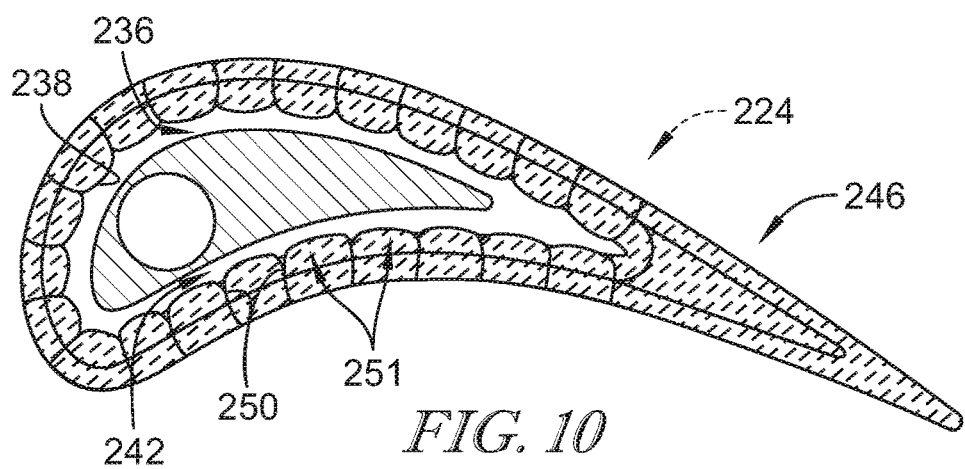
FIG. 10 is a cross section view of the airfoil and a second embodiment of a plurality of pins embedded in the airfoil and tensioned relative to the airfoil so that the inner surface of the airfoil is tufted with the pins to increase the heat transfer coefficient of the airfoil.

Another embodiment of an airfoil 224 with augmentation features 242 provided on an inner surface 238 of the airfoil 224 by through-thickness reinforcement structures is shown in FIG. 10. The airfoil 224 is similar to airfoil 24 except for the different through-thickness reinforcement structures used to provide the augmentation features on the inner surface 238 of the airfoil. Accordingly, similar reference numbers in the 200 series are shown in FIG. 10 to indicate similar features common between airfoil 24 and airfoil 224. The disclosure of airfoil 24 above is hereby incorporated herein for airfoil 224.

The augmentation features 242 on the inner surface 238 of airfoil 224 are provided by a plurality of reinforcement pins 250 that have been tufted with a ceramic reinforcement fiber preform 246 as shown in FIG. 10. The plurality of reinforcement pins 250 are made from pre-densified ceramic material such as, for example, silicon carbide, SCS-ultra fiber or SiC yarn, or another suitable ceramic material. Like airfoil 24, the plurality of reinforcement pins 250 are inserted into the ceramic reinforcement fiber preform 246 during a preforming stage (i.e. prior to infiltration with ceramic matrix material). Once embedded in the at least one ceramic reinforcement fiber preform 246, the inner surface 238 of the ceramic reinforcement fiber preform 246 is tufted with the reinforcement pins 250 to form lobed areas 251 on the inner surface 238 circumferentially between each of the reinforcement pins 250 as shown in FIG. 10. After being tufted, the ceramic reinforcement fiber preform 246 and the reinforcement pins may be infiltrated with ceramic matrix material to densify the fibers and the pins and form a one-piece CMC airfoil 224. The lobed areas 251 increase a heat transfer coefficient of the at least one ceramic reinforcement fiber preform 246 to facilitate cooling of the airfoil 224.

Figure 11:
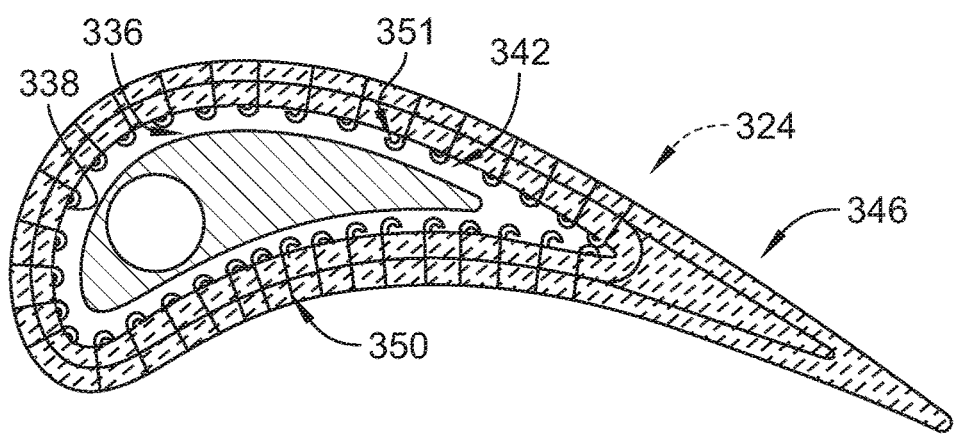
FIG. 11 is a cross section view of the airfoil and a plurality of through-thickness stitching that protrudes beyond the inner surface of the airfoil and into the cooling cavity to increase the heat transfer coefficient of the airfoil.

Another embodiment of an airfoil 324 with augmentation features 342 provided on an inner surface 338 of the airfoil 324 by through-thickness reinforcement structures is shown in FIG. 11. The airfoil 324 is similar to airfoil 24 except for the different through-thickness reinforcement structures used to provide the augmentation features 342 on the inner surface 338 of the airfoil 324. Accordingly, similar reference numbers in the 300 series are shown in FIG. 11 to indicate similar features common between airfoil 24 and airfoil 324. The disclosure of airfoil 24 above is hereby incorporated herein for airfoil 324.

The augmentation features 342 on the inner surface 338 of airfoil 324 are provided by sewing the airfoil 324 with ceramic fiber or yarn 350 during a preforming stage of at least one ceramic reinforcement fiber preform 346 of the airfoil 224 as shown in FIG. 11. The ceramic yarn 350 is sewn through the ceramic reinforcement fiber preform 346 to provide through-thickness reinforcement of the at least one ceramic reinforcement fiber preform 346. After being sewn with the ceramic fiber or yarn 350, the ceramic reinforcement fiber preform 346 and the ceramic fiber or yarn 350 may be infiltrated with ceramic matrix material to densify the fibers and the pins and form a one-piece CMC airfoil 324. The ceramic fiber or yarn 350 are sewn such that loops 351 are formed and protrude past the inner surface 338 of the airfoil 324 once the airfoil 324 is infiltrated to increase a heat transfer coefficient of the inner surface 338. The loops 351 may be oriented and/or laid down relative to the inner surface 338 to increase a roughness of the inner surface 338. This can selectively encourage cooling in discrete locations along the inner surface of the airfoil 324. The loops 351.

In some embodiments, a side-effect of a manufacturing approach (through-thickness reinforcement) typically used to improve CMC structural performance may be used to improve CMC component cooling performance and potentially reduce thermal stresses at the same time. In some embodiments, augmentation features may be used to increase the heat transfer coefficient at the CMC surface to maintain an acceptable temperature of the CMC component.

In some embodiments, through thickness reinforcement methods such as direct insertion or Z-pinning may be used to improve through thickness performance in composite structures. The direct insertion process can utilize pins e.g. pultruded SiC or SCS ultra fibre or yarns e.g. of SiC tows. These rigid features can be installed such that they protrude from the internal CMC surface and increase the turbulence of the coolant flow on the internal surface. In some embodiments, any other method of through-thickness reinforcement, such as tufting or stitching, which leaves local protrusions, may also be used.

In some embodiments, these features may be applied generally to the pressure and suction sides of CMC internal passage surface. Alternatively, they may be applied to discrete regions that require an increased level of cooling relative to the surrounding structure. The protrusion length, shape and/or diameter may be tuned to affect heat transfer characteristics.

In some embodiments, CMC materials are relatively low strength and are sensitive to thermal gradients. Rather than minimizing the reduction in CMC temperature, these features could be applied to manage the thermal gradients (i.e. increase the heat transfer coefficient of the coolant locally in line with the external heat transfer coefficient distribution).

In some embodiments, the augmentation features achieve a cooling performance benefit as an extra improvement from the manufacturing method. In some embodiments, the augmentation features provide an ability to tailor location and density of direct insertion (DI) pins to achieve spatially varying cooling augmentation. In some embodiments, the augmentation features provide an opportunity to use protruding pins to mechanically key coatings or other surface treatments. In some embodiments, the present disclosure may be used with any CMC structure where increased heat transfer would be advantageous (e.g. back side of a high-pressure seal segment (i.e. a blade track segment) or internal surfaces of rotating turbine airfoils).

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An airfoil assembly for use in a gas turbine engine, the airfoil assembly comprising
   an airfoil that extends axially relative to an axis, the airfoil being made from a ceramic matrix composite material and including an inner surface that defines an airfoil shaped cooling cavity that extends radially into the airfoil and an outer surface that defines a leading edge, a trailing edge, a pressure side, and a section side of the airfoil,
   a guide structure that extends axially relative to the airfoil and being made from a metallic material, the cooling cavity defined between the inner surface of the airfoil and an outer surface of the guide structure, and
   a plurality of pins embedded in and integrated with the airfoil, the plurality of pins being made from the ceramic matrix composite material and arranged to protrude away from the inner surface of the airfoil partway into the cooling cavity to increase a heat transfer coefficient of the airfoil.

2. The airfoil assembly of claim 1, wherein the plurality of pins include through-thickness reinforcement pins.

3. The airfoil assembly of claim 1, wherein the airfoil includes a body and a layer of environmental barrier coating coupled with the body, the body defines the inner surface and the environmental barrier coating defines the outer surface of the airfoil, each of the plurality of pins extends into the body toward the environmental barrier coating without extending through the environmental barrier coating.

4. The airfoil assembly of claim 3, wherein the each of the plurality of pins extends into the body to the environmental barrier coating and contacts the environmental barrier coating.

5. The airfoil assembly of claim 1, wherein the plurality of pins include a first end embedded in the airfoil and a second end spaced apart from the first end, the second end of each of the plurality of pins is cantilevered in the cooling cavity and spaced apart from the guide structure.

6. The airfoil assembly of claim 1, wherein each of the plurality of pins extends between a first end and a second end and have a non-circular cross section when viewed from the first end toward the second end.

7. The airfoil assembly of claim 1, wherein the plurality of pins includes a first set of pins located at a first axial location along the airfoil relative to the axis and a second row of pins spaced apart from the first row pins and located at a second axial location relative to the axis to define a channel between the first row of pins and the second row of pins for directing a flow of cooling air in the cooling cavity aft toward the trailing edge while impeding the flow of cooling air from moving axially away from the channel.

8. The airfoil assembly of claim 1, wherein the plurality of pins has a first density at the leading edge of the airfoil and a second density at a point located between the leading edge and the trailing edge along a camber line of the airfoil and the second density is less than the first density.

9. The airfoil assembly of claim 1, wherein each of the plurality of pins is tufted with the inner surface of the airfoil.

10. An airfoil assembly for use in a gas turbine engine, the airfoil assembly comprising
an airfoil that extends axially relative to an axis, the airfoil being formed from a ceramic matrix composite material and including an inner surface that defines a cavity that extends axially into the airfoil and an outer surface that defines a leading edge, a trailing edge, a pressure side, and a section side of the airfoil, the airfoil having the ceramic matrix composite material between the inner surface and the outer surface, and
a plurality of pins coupled with the airfoil, the plurality of pins including the ceramic matrix composite material and arranged to protrude away from the inner surface of the airfoil into the cavity.

11. The airfoil of claim 10, wherein each of the plurality of pins extends partway into the cavity.

12. The airfoil assembly of claim 10, further comprising a support spar that extends axially into the cavity.

13. The airfoil assembly of claim 10, wherein each of the plurality of pins extends between a first end and a second end and have a non-circular cross section when viewed from the first end toward the second end.

14. The airfoil assembly of claim 10, wherein the plurality of pins includes a first row of pins located at a first axial location along the airfoil relative to the axis and a second row of pins spaced apart from the first row pins and located at a second axial location relative to the axis to define a channel between the first row of pins and the second row of pins, and wherein the first row of pins and the second row of pins converge toward one another at a cooling hole formed in the airfoil.

15. The airfoil assembly of claim 10, wherein the airfoil includes a body and a layer of environmental barrier coating coupled with the body, the body defines the inner surface and the environmental barrier coating defines the outer surface of the airfoil, each of the plurality of pins extends into the body toward the environmental barrier coating.

16. A method comprising
forming ceramic fiber into an airfoil shaped preform having a cooling cavity defined in the preform,
inserting ceramic reinforcements through an outer surface the preform so that a portion of each reinforcement protrudes into the cooling cavity, and
infiltrating the preform with ceramic matrix material to densify the preform and to embed the reinforcements in the preform and to integrate the preform and the reinforcements together to form a ceramic matrix composite airfoil having a plurality of protrusions that extend into the cooling cavity.

17. The method of claim 16, wherein the reinforcements comprise linear and rigid pins.

18. The method of claim 17, wherein the inserting step includes pushing the pins into the preform to cause the ceramic fibers to be parted around the pins without the ceramic fibers fracturing.

19. The method of claim 18, wherein the pins cause the preform to tuft such that depressions that face the cooling cavity are provided in the ceramic matrix composite airfoil after the infiltrating step.

20. The method of claim 16, wherein the reinforcements comprise ceramic fibers the step of inserting includes stitching the ceramic fibers into the preform so that a portion of the ceramic fibers protrude into the cooling cavity.

* * * * *